March 24, 1970  E. R. CASALE  3,501,973
GEAR TIMING MEANS
Filed July 29, 1968
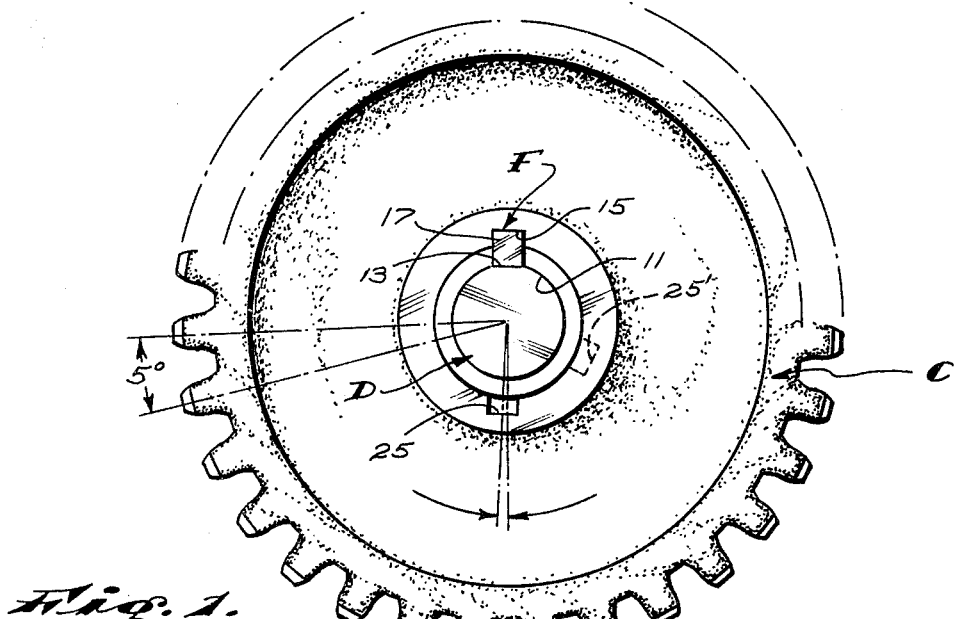
Fig. 1.
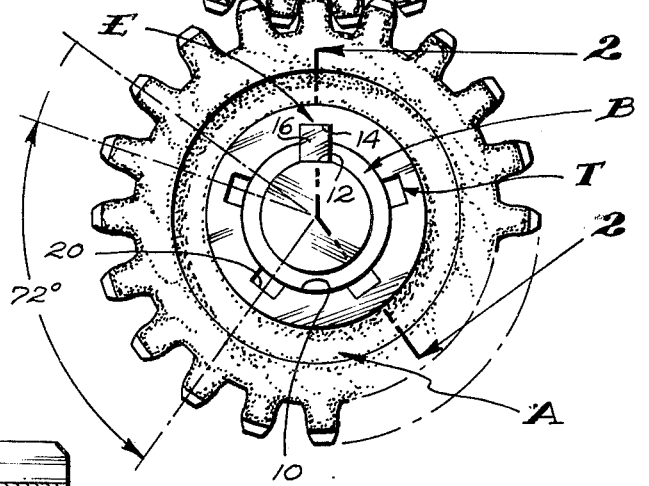
Fig. 2.
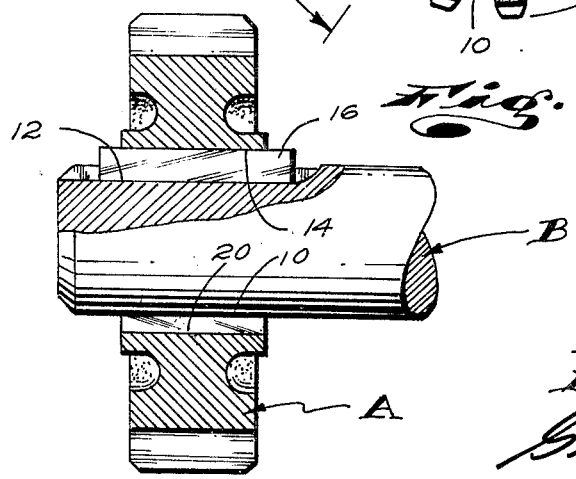
Inventor
Ernest R. Casale
By
Attorney

United States Patent Office 3,501,973
Patented Mar. 24, 1970

3,501,973
GEAR TIMING MEANS
Ernest R. Casale, Hacienda Heights, Calif. (% Casale Engineering, 161 8th Ave., City of Industry, Calif. 91744)
Filed July 29, 1968, Ser. No. 748,274
Int. Cl. F16h 35/06, 35/08; F01l 1/00
U.S. Cl. 74—395                                        11 Claims

ABSTRACT OF THE DISCLOSURE

A means for adjusting the timing or relative rotative position of a pair of shafts driven by a pair of related meshed gears by fractions of the circumferential extent of one tooth of one and/or the other of said gears, which means includes a keyway in the shaft on which each gear is mounted, a plurality of circumferentially spaced keyways in the central shaft receiving opening in each gear and keys in keyways in the shafts and each engaged in a selected predetermined keyway in its related gear, the keyways in at least one gear being equally spaced circumferentially of the gear and even in number if the number of teeth is uneven and uneven in number if the number of teeth is even. The keyways in one gear, if desired, are circumferentially offset a distance equal to a predetermined fraction of the circumferential relative movement between the shafts effected by movement of the key related to the other gear from engagement in one keyway in the gear in the next adjacent keyway therein.

---

In the mechanical arts, where gear trains are employed, it frequently becomes necessary to vary and adjust the relative rotative position of shafts on which pairs of meshed gears are mounted. Such adjustment frequently requires that the shafts be adjusted circumferentially a distance equal to a fraction of the circumferential extent of one tooth of one of the gears, or a distance equal in circumferential extent to one or a multiplicity of teeth plus a fraction of the circumferential extent of one tooth.

In those cases where gears are subjected to little force and abuse and can be fixed to their related shafts by lock bolts, set screws and the like, and where infinite circumferential turning and adjustment of the gears on their related shafts can be effected, no problem exists, however, in those cases where set screws and the like are not sufficient to fix the gears on their related shafts and keys must be provided, considerable and great difficulty is experienced in adjusting the timing or relative rotative position of the gear shafts, other than a distance equal to the circumferential extent of one tooth of one of the gears. In such cases and where an adjustment equal to a distance less than the circumferential extent of one tooth is to be made, it has been the practice of the prior art to remove a gear and cut a new keyway in it, which keyway is spaced from the original keyway a distance equal to the circumferential extent of a predetermined number of teeth plus that fractional distance which is required to make the desired adjustment and in which case the original keyway is abandoned. If the new keyway still fails to provide the desired adjustment, the whole operation of cutting still another and special keyway in the gear is performed again.

In accordance with the above practices of the prior art, no consideration is made to the relative position of the new and special keyways in the gears to the original or previously established special keyways, except that sufficient stock be left in the gears between adjacent keyways so as not to unduly weaken the gears. Further, no particular or special attention is given to the number of teeth in the gears and how or why a predetermined number of keyways, in predetermined spaced relationship, could or might advantageously effect varying and adjusting the timing of the gears.

An object of this invention is to provide novel means for adjusting the relative rotation of a pair of related gear shafts to a selected one of a predetermined number of rotative positions, each equal to predetermined fractions of the circumferential extent of a tooth on one of the gears.

Another object of my invention is to provide a means of the character referred to which involves a keyway in one of the shafts, a plurality of circumferentially spaced keyways in the gear, and a key in the keyway in the shaft and engaged in a selected one of the keyways in the gear to effect the desired rotative adjustment between said shaft and said gear and the gear and the shaft related thereto.

Yet another object of the present invention is to provide a means of the character referred to wherein the plurality of keyways in the gear are spaced equally, circumferentially and are even in number when the number of teeth on the gear is equal or are uneven in number if the number of teeth on the gear is uneven.

Still further, it is an object of my invention to provide a means of the character referred to wherein one of a pair of related gears is provided with a plurality of keyways in accordance with the foregoing and the other of the gears is provided with a pair of keyways which are spaced circumferentially apart a distance equal to the circumferential extent of a predetermined number of teeth on said gear, plus a distance equal to one-half the fractional distance of adjustment effected by rotative movement of said one gear a distance from one of the keyways therein to a next or adjacent keyways therein whereby the selection of rotative positions afforded by the keyways in said one gear is doubled by the provision of the single additional keyway in said other gear.

Finally, it is an object of this invention to provide a means of the character referred to which is easy and economical to manufacture, a means which is easy and convenient to operate and a means which is highly effective and dependable in operation.

The foregoing and other objects and features of my invention will be fully understood from the following detailed description of a typical preferred form and application of my invention, throughout which description reference is made to the accompanying drawings, in which:

FIG. 1 is an end elevational view of a pair of related shafts and gears with my new timing means related thereto; and, FIG. 2 is a longitudinal sectional view of a portion of the structure shown in FIG. 1 and taken substantially as indicated by line 2—2 on FIG. 1.

In FIG. 1 of the drawings I show an end view of a pair of engaged gears on the ends of a pair of parallel shafts. For the purpose of this disclosure, the gear drive illustrated can be considered the valve timing gear for an internal combustion, reciprocating engine. The lower and smaller of the two gears is a drive gear A and is engaged on a crank shaft B and the upper and larger gear is a driven gear C and is engaged on a cam shaft D.

The gears A and C are simple spur gears with central openings 10 and 11, respectively, and in which and through which their related shafts B and D are slidably engaged.

In accordance with common practice, the gears A and C are fixed on their related shafts D and B against rotation by key means E and F, which key means includes an elongate, axially extending, radially outwardly opening inner keyway 12 in the shaft B, a similar keyway 13 in the shaft D, a first or principal, elongate, axially extending, radially inwardly opening outer keyway 14 in the opening 10 in the gear A and opposing the keyway 12, a similar first or principal, outer keyway 15 in the opening 11 in the gear C and opposing the inner keyway 13, an elongate, axially extending key 16 slidably engaged in and extending between the keyways 12 and 14 and a similar, elongate key 17 slidably engaged in and extending between the keyways 13 and 15.

For the purpose of this disclosure, it can be assumed that the gear A has 36 teeth and the gear C has 72 teeth whereby a two-to-one ratio is established by the gear train.

The teeth on the gear A, being 36 in number, are spaced, circumferentially, ten degrees from each other and can be considered to be ten degrees in circumferential extent.

The teeth on the gear C, being 72 in number, are spaced, circumferentially, five degrees from each other and can be considered to be five degrees in circumferential extent.

The gear train thus far described is a typical or conventional timing gear train and is such that if it were desired to vary or adjust the relative rotative position of the shafts B and D, to either advance or retard the timing therebetween, the gear A could be pulled axially out of engagement from the gear C and rotated left or right a distance equal to one tooth, that is, ten degrees or any multiple thereof, and then urged axially back into engagement with the gear C.

In such a case, the finest or smallest adjustment of timing that can be made is 5 degrees, which is frequently not a small or fine enough adjustment.

Alternatively, the gear C could be moved axially out of engagement with the gear A and rotated left or right for advancement or retardation of the timing effected by the train. In such a case, the gear C can be moved one tooth or five degrees or any multiple thereof.

In such a case, the finest or smallest adjustment of timing that can be made is 2½ degrees, which is frequently not a small or fine enough adjustment.

The timing means T that I provide is such that adjustments of the rotative position of one shaft relative to the other shaft amounting to fractions of the adjustments that can be made by changing to rotative positions of the gears distances equal to the circumferential extent of the teeth on the gears.

The means T, in the simplest and preferred carrying out of the invention, involves or includes, in addition to the outer keyway 14 in the gear A, four (4) additional or supplemental outer keyways 20 in the opening 10 of the gear A in equal, circumferential spaced relationship from each other. Accordingly, the means T provides five outer keyways in the gear A spaced 72° circumferentially from each other and includes or incorporates the inner keyway 12 and the key 16 of the conventional key means E.

The ratio of the number of keyways 14 and 20 to the number of teeth on the gear is extremely important. If the number of teeth is an even number, the number of keyways in the gear must be uneven. Whereas, if the number of teeth is uneven, the number of keyways must be even. The number of teeth cannot be an even multiple of the number of keyways.

In light of the above, the minimum number of keyways, when an odd number of keyways is to be provided, is three (3), whereas, when an even number of keyways is required, the minimum number of keyways is two (2).

The maximum number of keyways in the gear A, whether even or odd in number is determined by the size of the opening 10, the size of the keyways and by the physical and/or structural limits afforded by these two factors. In a gear with a small shaft opening, two or three keyways may be all that can be provided, whereas, in a gear with a large shaft opening and a relatively small key, as many as ten or eleven openings might be provided.

In light of the above and referring to the case illustrated in the drawings, wherein five outer keyways are provided in the gear A, it will be apparent that when it is desired to vary the timing of the shafts, the gear A can be shifted axially out of engagement with the gear C and the key 16, rotated to align one of the keyways 20 with the key 16 and then urged axially back into engagement with the key 16 and with the gear C. The above results in varying the rotative position of the gear A on the shaft B a distance unequal to the circumferential extent of one tooth on the gear or a multiple thereof. Accordingly, the gear is rotated on the shaft a fraction of the circumferential extent of one tooth of the gear.

In the case illustrated and since the gear A has thirty-six teeth, each ten degrees in circumferential extent, and there are five outer keyways in the gear, rotating the gear one keyway or seventy-two degrees results in an effective rotative adjustment of the gear A relative to the shaft B one-fifth (⅕) of one tooth, or two degrees. Rotating the position of the gear on the shaft two or more of the five keyways effects an adjustment of four, six or eight degrees.

The direction in which the gear is rotated relative to the shaft determines whether the adjustments effect an advancement or retardation of the timing of the shafts.

Greater or coarser rotative adjustment of the gear A relative to the crank shaft can be effected by eliminating certain intermediate outer keyways and so that every other of the above-noted variations can be obtained, or a lesser number of equally spaced, outer keyways can be provided. For example, three (3) keyways spaced 120 degrees apart can be provided, in which case, the adjustment effected by moving the gear one keyway would effect a rotative adjustment of the gear on the shaft 3.3 degrees or ⅓ the circumferential extent of one tooth on the gear.

Finer rotative adjustment can be obtained by increasing the number of outer keyways. For example, seven (7) outer keyways, spaced 51.44 degrees apart would effect an adjustment equal to ⅐ the circumferential extent of one gear tooth and eight keyways would effect adjustment in multiples of ⅛ the circumferential extent of one gear tooth.

Since the ratio between the drive gear A and driven gear C is two-to-one, the above-noted adjustments being made at the smaller of the two gears effects a relative rotative adjustment between the shafts B and D of one-half the adjustment of the gear A on the shaft B.

Referring to the first example given above, where the adjustments made is two degrees, the adjustment in timing between the shafts would be one degree.

In light of the above, it will be apparent that with the timing means T as provided herein, the relative rotative position of the shafts B and D can be advantageously varied fractions of the circumferential extent of one tooth on the gear A, as desired or as circumstances require.

In another form and carrying out of my invention and as illustrated in FIG. 1 of the drawings, the key means F between the gear C and shaft D is modified by providing a secondary outer keyways 25 in the shaft oepning 11, which secondary keyways is spaced circumferentially from the first or primary outer keyway 15 a distance equal to a multiple of the circumferential extent of each tooth on the gear C, plus or minus a distance which will divide the rotative adjustment, effected by movement of the gear A on the shaft B, in half. With such an arrangement of parts, the number of positions of adjustment afforded by the timing means on the gear A is doubled.

In carrying out the timing of the gear train, employing this second or modified form of the invention, if the desired time is not gained by advancing or retarding the gear A on the shaft B, one keyway 20 and the desired timing would occur between the timing effected by moving the gear A one keyway, the gear C is rotated clockwise or counter-clockwise from one keyway therein to the other and so that the previous adjustment is divided or cut in half.

In the example given, when the gear A has thirty-six teeth and the gear C has seventy-two teeth, to effect a two-to-one ratio, the outer secondary keyway 25 would be spaced circumferentially a distance equal to a multiple of the circumferential extent one tooth of the gear (5°), for example, 180°, plus or minus one-half of one degree, or 179.5° or 180.5°.

In yet another form and carrying out of my invention, the secondary keyways 25 in the gear C is spaced from the primary outer keyway a distance equal to a multiple of the circumferential extent of one tooth in the gear C plus or minus a distance equal to one-third (⅓) the adjustment effected by moving the gear A one keyway 20 on the shaft B.

With such a combination and relationship of parts if a fine intermediate adjustment is necessary or desired, the gear C can be rotated clockwise or counterclockwise to effect an advancing or a retarding of the time effected by movement of the gear A one keyway in the magnitude or to the extent of one-third (⅓) of the primary adjustment or one-third of one degree.

This second modification triples the number of possible adjustments and distinguishes from the first modification or second form of the invention in that the gear C must be turned either clockwise or counterclockwise to either advance or retard the timing.

In the example given above, and in the third form of the invention, the keyways 25 would be spaced from the keyway 15 180° plus or minus ⅓°.

In the second form of the invention timing changes between the gears equal to ⅟₁₀ of the circumferential extent of one tooth on the gear A and in the third form of the invention gear timing adjustments equal to ⅟₁₅ of one tooth is made possible.

If desired and without departing from the spirit of this invention, the idea of means of the second and third forms of the invention can be combined by providing the secondary outer keyway 25 in the gear C in accordance with the second form of the invention and provided a third outer keyway 25', shown in phantom lines in FIG. 1 of the drawings and in accordance with the third form of the invention.

In such a combination and relationship of parts, the number of positions of adjustment of time effected by rotation of the gear A on the shaft B and from one outer keyways to the other is multiplied five times and so that in the example given, the smallest adjustment between the gears is equal to ⅟₂₅ the circumferential extent of one tooth on the gear A, which would be equal to rotating the gear A .400° on the shaft B and which would effect relative rotative adjustment between the shafts B and D one-twenty-fifth of one degree or 15 seconds.

It is to be understood that the timing means T in the gear A could be provided in the gear C instead of in the gear A and further that the timing means provided in the gear C, whether the same as in the second, third or fourth form of the invention, could be provided in the gear C instead of in the gear A, all without departing from the spirit of this invention.

While I have shown the timing means T as including a plurality of outer keyways in the one or both gears, it will be apparent that the multiplicity of keyways could be provided in the shafts without departing from the spirit of this invention or, if desired, the multiplicity of keyways related to one gear and its shaft could be in the gear and in the other gear and its shaft and the multiplicity of keyways could be in the shaft, as circumstances require or as desired.

Having described my invention, I claim:

1. A rotatably supported shaft element, a gear element having a predetermined number of circumferentially spaced teeth engaged on and carried by the shaft element, a rotatably supported shaft part, a gear part engaged on and carried by the shaft part and having a predetermined number of circumferentially spaced teeth differing in number from the teeth on the gear element and meshed therewith and timing means to change the rotative position of the gear elements on the shaft element to change the relative rotative position of the shaft element and the part including, a single, primary keyway in one element and a plurality of circumferentially spaced secondary keyways in the other element and a key in said primary keyway and engaged in a predetermined one of said secondary keyways, to establish driving engagement between the elements, said secondary keyways being spaced equidistance from each other and spaced apart a distance unequal to the circumferential extent of one or a multiple of the circumferential extent of one of the teeth on the gear element.

2. A structure as set forth in claim 1 wherein the number of teeth on said gear element is uneven and the number of secondary keyways is even.

3. A structure as set forth in claim 1 wherein the number of the teeth on said gear elements is even and the number of secondary keyways is uneven.

4. A structure as set forth in claim 1 wherein the gear element has a central shaft receiving opening, said secondary keyways being formed in the gear element and opening radially inwardly into said opening, said primary keyway being formed in the shaft element and opening radially outwardly, the number of teeth on said gear element is uneven and the number of secondary keyways is even.

5. A structure as set forth in claim 1 wherein the gear element has a central shaft receiving opening, said secondary keyways being formed in the gear element and opening radially inwardly into said opening, said primary keyway being formed in the shaft element and opening radially outwardly, the number of teeth on said gear element is uneven and the number of secondary keyways is even, the number of teeth on said gear element is even and the number of secondary keyways is uneven.

6. A structure as set forth in claim 1 wherein the gear element has a central shaft receiving opening, said primary keyway being formed in the gear element and opening radially inwardly into said opening, said secondary openings being formed in the shaft and opening radially inwardly into said opening, said secondary openings being formed in the shaft and opening radially outwardly, the number of teeth on said gear element being uneven and the number of secondary keyways being even.

7. A structure as set forth in claim 1 wherein the gear element has a central shaft receiving opening, said primary keyway being formed in the gear element and opening radially inwardly into said opening, said secondary openings being formed in the shaft and opening radially inwardly into said opening, said secondary openings being formed in the shaft and opening radially outwardly, the number of teeth on said gear element being uneven and the number of secondary keyways being even, the number of teeth on said gear elements being even and the number of secondary keyways being uneven.

8. A structure as set forth in claim 1 and further including a first keyway in one of said parts and a pair of circumferentially spaced second keyways in the other of said parts and a key in said first keyway engaged in a predetermined one of the second keyways to establish driving engagement between the parts, the pair of second keyways being spaced apart a distance equal to the relative circumferential movement between the shaft part and shaft element effected by moving the key related to the elements from one secondary keyway into a next adjacent secondary keyway or a multiple distance thereof plus a distance equal to a predetermined fraction of said relative circumferential movement.

9. A structure as set forth in claim 1 and further including a first keyway in one of said parts and a pair of circumferentially spaced second keyways in the other of said parts and a key in said first keyway engaged in a predetermined one of the second keyways to establish driving engagement between the parts, the pair of second keyways being spaced apart a distance equal to the relative circumferential movement between the shaft part and shaft element effected by moving the key related to the elements from one secondary keyway into a next adjacent secondary keyway or a multiple distance thereof plus a distance equal to a predetermined fraction of said relative circumferential movement, said additional predetermined fractional movement being one-half of said relative circumferential movement.

10. A structure as set forth in claim 1 and further including a first keyway in one of said parts and a pair of circumferentially spaced second keyways in the other of said parts and a key in said first keyway engaged in a predetermined one of the second keyways to establish driving engagement between the parts, the pair of second keyways being spaced apart a distance equal to the relative circumferential movement between the shaft part and shaft element effected by moving the key related to the elements from one secondary keyway into a next adjacent secondary keyway or a multiple distance thereof plus a distance equal to a predetermined fraction of said relative circumferential movement, said additional predetermined fractional movement being one-third of said relative circumferential movement.

11. A structure as set forth in claim 1 and further including a first keyway in one of said parts and three second keyways in the other of said parts and a key in said first keyway and engaged in a predetermined one of the second keyways to establish driving engagement between the parts, the space between the said one of the second keyways and each of the other two second keyways being equal to the relative circumferential movement between the shaft part and shaft element effected by moving the key related to the elements from one secondary keyway into a next adjacent secondary keyway or a multiple distance thereof plus a distance equal to predetermined fractions of said relative circumferential movement, said additional predetermined fractional movement effected by one of said other two second keyways being one-half of said relative circumferential movement and the said additional predetermined fractional movement affected by the other of said other two second keyways being one-third of said relative circumferential movement.

References Cited

FOREIGN PATENTS 21,765   2/1912   Great Britain.

LEONARD H. GERIN, Primary Examiner

U.S. Cl. X.R.

123—90